2,816,107

HYDROLYSIS OF ISOBUTYRIC ACID ESTERS OF CELLULOSE

Carl J. Malm and Loring W. Blanchard, Jr., Rochester, N. Y., assignors to Eastman Kodak Company, Rochester, N. Y., a corporation of New Jersey No Drawing. Application January 26, 1956, Serial No. 561,661

3 Claims. (Cl. 260—230)

This invention relates to a method of preparing hydrolyzed isobutyric acid esters of cellulose in which the combined sulfuric acid therein is reduced to a minimum and with a reduced time cycle.

In the manufacture of cellulose esters, cellulose is esterified with a fatty acid anhydride and a sulfuric acid catalyst. The esters ordinarily are hydrolyzed by destroying the anhydride, imparting a small water content to the bath, and allowing the mass to stand. Combined sulfuric acid and a certain amount of acyl is removed from the cellulose ester. In the making of isobutyric acid esters of cellulose, due to the sluggish nature of the isobutyric anhydride employed in its preparation, certain problems arise which are not met with in the making of some of the other cellulose esters. For instance, in the making of the cellulose isobutyrates, it is also desirable to use an excess of isobutyric anhydride to obtain the desired degree of esterification. Also in some cases it is desirable towards the end of the esterification to add some more active anhydride to assist in carrying the reaction to completion. In various cases in preparing cellulose isobutyrates, there are obtained viscous solutions of that ester containing a large amount of anhydride at the end of the esterification. Due to the large amount of anhydride present a considerable time may be required before enough water is supplied to the mass to react with all of the anhydride in converting to hydrolysis conditions. During the extended time the water is added breakdown of the cellulose viscosity may occur. It is especially important to add water slowly to the mass when the mixture is becoming aqueous in order to remove the combined sulfuric acid in the cellulose ester if a stable product is to be obtained.

One object of our invention is to provide a method of preparing a hydrolyzed cellulose isobutyrate in which conditions which will result in breakdown of the viscosity are avoided. Another object of our invention is to provide a method for preparing hydrolyzed cellulose isobutyrates in which the viscosity decrease during the water addition is reduced to a minimum. Other objects of our invention will appear herein.

We have found that if after the esterification of the cellulose has been completed, the mass is first diluted with acetic or propionic acid, and water short of the quantity required to entirely react with the anhydride is quickly added followed by the slow addition of water thereto to introduce hydrolysis conditions, breakdown of the cellulose is avoided and a product of good properties is obtained. In some cases it may be desirable to also add some neutralizing agent particularly magnesium carbonate or magnesia to neutralize some of the sulfuric acid present in the mass. Our method not only avoids undue viscosity lowering of the cellulose ester but in addition promotes the removal of combined sulfuric acid from the cellulose isobutyrate which is obtained.

In its broadest aspects our invention comprises first adding to the esterification mass resulting from reacting upon cellulose with isobutyric anhydride and sulfuric acid catalyst, acetic or propionic acid at a temperature not above room temperature. The amount of acid added can be as much as equal parts to the mass, the criterion being that the mass becomes readily flowable. Ordinarily it is desirable to add at least one part of acid for every 4 parts of esterification mass, the parts being by weight. If it is desired to keep the temperature of the mass well down, the acid which is added may be chilled such as to as low a temperature as the acid can have without being in solid condition. After the mass has been diluted to a comparatively low viscosity solution, water in the form of aqueous acetic or propionic acid is rapidly added thereto, the amount of water added being that which is just short of reaction with all of the anhydride which is present. For instance, at least 95% of the anhydride is destroyed by this rapid water addition, the water being added within a time of not more than 15 minutes and preferably even in a period of 5 minutes or less. With the addition of this water, the temperature rises rapidly such as to at least 110° F. For good viscosity esters, it is desirable that the temperature at this point be no more than 170° F. The temperature which is reached by the addition of water may be adjusted both by the temperature of the cooled acid which is added to dilute the mass and by the speed at which the water is added thereto. After this initial rapid addition of water and while the elevated temperature reached is maintained, water in the form of aqueous acetic or propionic acid is added slowly to destroy any anhydride which has not already been destroyed and incorporating water into the mass such as in a proportion of 5–10% water. This addition of water takes place slowly such as over a period of ½ hour. Also some neutralization of the sulfuric acid can take place such as by the addition of a small amount of magnesium carbonate, if the sulfuric acid present is regarded as too large a proportion for hydrolysis. This slow addition of water at an elevated temperature removes the combined sulfuric acid from the cellulose ester and also initiates the hydrolysis of that ester. The mass is then allowed to stand preferably with a lowering of the temperature particularly if the temperature is above the 100–110° F. range. The mass is then kept at the 100–110° F. temperature until the cellulose ester takes on the desired hydroxyl content such as a hydroxyl content of up to 5%. The following example illustrates our invention:

Example

.8 pound of cellulose was activated by treating with 5% aqueous sulfuric acid and the water was removed therefrom by means of concentrated propionic acid. The resulting cellulose contained .8 pound of propionic acid and 3% of sulfuric acid based on the weight of the cellulose. This cellulose mass was added to an esterification mixer together with 4.8 pounds of isobutyric anhydride. The mass was mixed until a maximum temperature of 88° F. was reached. After the maximum temperature was reached, 7 hours was required to give a clear viscous solution indicating esterification. The mass was then diluted with 3 pounds of room-temperature propionic acid, imparting good flowability. To the resulting solution having a temperature of 85° F. was added 82 cc. of water and 82 cc. of propionic acid, this mixture being added over a period of 5 minutes the temperature rose to 122° F. There was then added over a period of ½ hour a mixture of 150 cc. of water and 850 cc. of acetic acid keeping the temperature of 120° F. during the addition. The temperature was lowered to 110° F. and the mass was stirred at this temperature for 48 hours whereby the desired hydroxyl content was imparted to the cellulose isobutyrate. The product was separated by precipitating into dilute aqueous acid and was washed and dried in the usual manner.

We claim:

1. A method of preparing hydrolyzed isobutyric acid esters of cellulose which comprises esterifying cellulose with isobutyric anhydride and sulfuric acid catalyst, diluting the mass with fatty acid of 2-3 carbon atoms in sufficient amount to render it readily flowable, adding water in the form of aqueous fatty acid in an amount which will destroy at least 95% but less than 100% of the anhydride therein, over a period of less than 15 minutes, whereby the mass rises to a temperature of 110-170° F., then slowly adding to the mass sufficient water in the form of aqueous fatty acid to supply 5-10% of water thereto while maintaining the temperature at at least 110° F. and allowing the mass to stand at a temperature of approximately 100-110° F. until the cellulose ester has the desired hydroxyl content.

2. A method of preparing hydrolyzed isobutyric acid esters of cellulose which comprises esterifying cellulose with isobutyric anhydride and sulfuric acid catalyst, diluting the mass with propionic acid in an amount sufficient to render it readily flowable, adding water in the form of aqueous propionic acid in an amount sufficient to destroy at least 95% and less than 100% of the anhydride therein, over a period of less than 15 minutes, whereby the mass rises to a temperature of 110-170° F., then slowly adding to the mass sufficient water in the form of aqueous acetic acid to supply 5-10% of water thereto while maintaining the temperature at at least 110° F. and allowing the mass to stand at a temperature of approximately 100-110° F. until the cellulose ester has the desired hydroxyl content.

3. A method of preparing hydrolyzed isobutyric acid esters of cellulose which comprises esterifying cellulose with isobutyric anhydride and sulfuric acid catalyst, diluting the mass with propionic acid in an amount sufficient to render it readily flowable, adding water to the mass in the form of aqueous propionic acid in an amount which will destroy at least 95% and less than 100% of the anhydride present over a period of approximately 5 minutes whereby the mass rises to a temperature of 125° F., then slowly adding to the mass water in the form of aqueous acetic acid to supply 5-10% of water thereto while maintaining the temperature at at least 110° F. and allowing the mass to stand at approximately 110° F. until the cellulose ester has the desired hydroxyl content.

References Cited in the file of this patent

UNITED STATES PATENTS

| | | |
|---|---|---|
| 2,250,201 | Malm et al. | July 22, 1941 |
| 2,343,669 | Hincke et al. | Mar. 7, 1944 |